(12) United States Patent
VanBlon et al.

(10) Patent No.: US 10,741,182 B2
(45) Date of Patent: Aug. 11, 2020

(54) VOICE INPUT CORRECTION USING NON-AUDIO BASED INPUT

(71) Applicant: Lenovo (Singapore) Pte. Ltd., Singapore (SG)

(72) Inventors: Russell Speight VanBlon, Raleigh, NC (US); Rod D. Waltermann, Rougemont, NC (US); Suzanne Marion Beaumont, Wake Forest, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 45 days.

(21) Appl. No.: 14/182,875

(22) Filed: Feb. 18, 2014

(65) Prior Publication Data
US 2015/0235641 A1 Aug. 20, 2015

(51) Int. Cl.
*G10L 15/26* (2006.01)
*G10L 15/24* (2013.01)
*G06F 40/00* (2020.01)
*G10L 15/25* (2013.01)

(52) U.S. Cl.
CPC ............ *G10L 15/26* (2013.01); *G06F 40/00* (2020.01); *G10L 15/24* (2013.01); *G10L 15/25* (2013.01)

(58) Field of Classification Search
CPC ......... G10L 15/24; G10L 15/25; G10L 15/26; G06F 17/20
USPC ........................................................ 704/235
See application file for complete search history.

(56) References Cited

U.S. PATENT DOCUMENTS

| | | | | |
|---|---|---|---|---|
| 6,006,175 A | * | 12/1999 | Holzrichter | A61B 5/0507 704/205 |
| 8,635,066 B2 | * | 1/2014 | Morrison | G06K 9/00221 704/231 |
| 8,700,392 B1 | * | 4/2014 | Hart | G10L 15/25 704/231 |
| 2002/0194005 A1 | * | 12/2002 | Lahr | G10L 15/24 704/271 |
| 2003/0125945 A1 | * | 7/2003 | Doyle | 704/246 |
| 2004/0122675 A1 | | 6/2004 | Nefian et al. | |
| 2004/0243416 A1 | | 12/2004 | Gardos | |
| 2008/0180564 A1 | * | 7/2008 | Yamaji | H04N 5/232 348/372 |
| 2010/0280983 A1 | * | 11/2010 | Cho | G06F 3/0346 706/46 |
| 2011/0311144 A1 | * | 12/2011 | Tardif | G10L 15/25 382/195 |

(Continued)

FOREIGN PATENT DOCUMENTS

| CN | 102314595 A | 1/2012 |
|---|---|---|
| EP | 0254409 A1 | 1/1988 |

(Continued)

*Primary Examiner* — Bharatkumar S Shah
(74) *Attorney, Agent, or Firm* — Ference & Associates LLC

(57) ABSTRACT

An embodiment provides a method, including: accepting, at an audio receiver of an information handling device, voice input of a user; interpreting, using a processor, the voice input; identifying, using a processor, at least one ambiguity in interpreting the voice input; thereafter accessing stored non-audible input associated in time with the at least one ambiguity; and adjusting an interpretation of the voice input using non-audible input. Other aspects are described and claimed.

18 Claims, 3 Drawing Sheets

(56) References Cited

U.S. PATENT DOCUMENTS

| | | | |
|---|---|---|---|
| 2012/0035924 A1* | 2/2012 | Jitkoff | G01C 21/3608 |
| | | | 704/235 |
| 2013/0151250 A1* | 6/2013 | VanBlon | G10L 15/32 |
| | | | 704/235 |
| 2013/0275164 A1* | 10/2013 | Gruber | G10L 17/22 |
| | | | 705/5 |
| 2014/0379346 A1* | 12/2014 | Aleksic | G10L 15/25 |
| | | | 704/251 |
| 2015/0088515 A1* | 3/2015 | Beaumont | G10L 17/06 |
| | | | 704/251 |
| 2015/0161997 A1* | 6/2015 | Wetsel | G06F 3/167 |
| | | | 704/275 |

FOREIGN PATENT DOCUMENTS

| | | |
|---|---|---|
| WO | 2007114346 A1 | 10/2007 |
| WO | 2013097075 A1 | 7/2013 |

* cited by examiner

VOICE INPUT CORRECTION USING NON-AUDIO BASED INPUT

BACKGROUND

Information handling devices ("devices"), for example laptop computers, tablets, smart phones, e-readers, desktop computers, smart-televisions, etc., may be used in connection with a voice input interface that converts voice input into machine text. Many different device applications (e.g., all those permitting text input) therefore may utilize voice input if a voice input interface is provided. Common examples include messaging applications (e.g., instant messaging applications, SMS-text messaging applications, email applications), word processing applications, Internet searching applications, navigation applications (either in-vehicle or provided in a handheld or other mobile format), etc. A device will run a voice input interface (speech-to-text or speech recognition engine) as a global service providing an input interface, e.g., similar to a keyboard or touch screen input interface, that may be utilized across applications. Certain applications (or groups thereof) may provide a voice input functionality independently or as an application sub-component or feature.

A voice input interface may misinterpret the voice input, i.e., the wrong text is input for the corresponding voice input (e.g., command, message content, etc.). A user may manually change or correct the misinterpreted text, e.g., deleting it and re-inputting it. This requires selecting the invalid text and re-speaking or typing the correct text. A user may also select low-confidence text, e.g., words or phrases that the voice input interface indicates may be misinterpreted, and choose replacements from a drop-down list.

BRIEF SUMMARY

In summary, one aspect provides a method, comprising: accepting, at an audio receiver of an information handling device, voice input of a user; interpreting, using a processor, the voice input; identifying, using a processor, at least one ambiguity in interpreting the voice input; thereafter accessing stored non-audible input associated in time with the at least one ambiguity; and adjusting an interpretation of the voice input using non-audible input.

Another aspect provides an information handling device, comprising: an audio receiver; a sensor that captures input; a processor; and a memory storing instructions that are executed by the processor to: accept, at the audio receiver, voice input of a user; interpret the voice input; identify at least one ambiguity in interpreting the voice input; thereafter access stored non-audible input associated in time with the at least one ambiguity; and adjust an interpretation of the voice input using non-audible input derived from the sensor.

Another aspect provides a product, comprising: a device readable storage device having device readable code stored therewith, the device readable code being executable by a processor and comprising: code that accepts voice input of a user; code that interprets the voice input; code that identifies at least one ambiguity in interpreting the voice input; code that thereafter accesses stored non-audible input associated in time with the at least one ambiguity; and code that adjusts an interpretation of the voice input using non-audible input.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
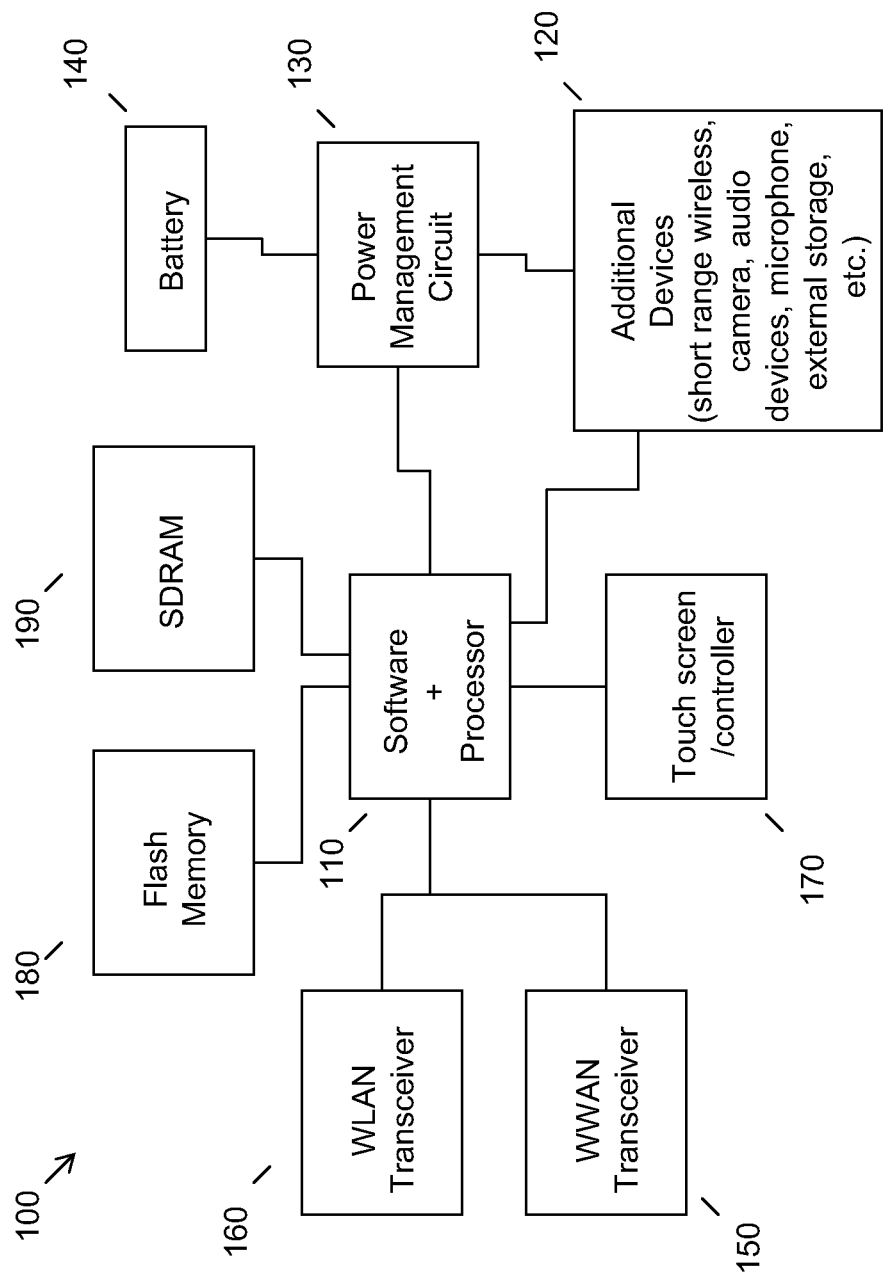
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Voice input interfaces are becoming increasingly popular. While the accuracy of speech-to-text conversion has been improved and continues to improve, inevitably mistakes in the proper conversion of voice input into machine text takes place. For example, existing speech detection uses audio to determine what is said. Since many sounds are similar, this causes erroneous speech detection. For example, consonant sounds such as "B", "C", "D", "E", "G", "P", "T", "V", "Z", etc., sound the same or similar and audio-based speech detection cannot always correctly interpret what was said.

Although conventional mechanisms exist for correcting errant input conversions, e.g., manually correcting it or selecting a "best guess" from a drop down menu, each requires a rather intrusive fix that is implemented by the user breaking his or her voice input and intervening manually with the system. Thus, even when a drop down menu is provided, this still requires the user to fix each misinterpretation manually. Moreover, relying on a drop down menu pre-supposes that the voice input interface has correctly identified the word(s) for which errant input may have taken place. That is, some words of the text input may be incorrect and nonetheless not be identified as low-confidence, or vice-versa, by the system. This reduces the chance of quickly fixing every misinterpretation in an intuitive or user friendly manner.

Moreover, in systems that employ contextual data to assist in interpreting voice input, this presupposes appropriate contextual data is available and may be utilized. For example, many existing solutions use context to determine correct speech by verifying that the words initially interpreted make sense in a given phrase/sentence. Drawbacks to this approach include but are not limited to imperfect corrections given the vast amount of possibilities that exist, imprecision in cases where a sentence could have multiple contexts that are acceptable, requirement of a large contextual database and processing power to examine the database quickly for each phrase, requirement of a cloud-connection (or like connection) unless a subset of the contextual database is stored locally, etc.

Accordingly, an embodiment provides mechanisms for correcting errant conversion of speech (referred to throughout as "voice input") into machine text. By way of example, an embodiment provides a method in which voice input is accepted at an audio receiver, e.g., a microphone, of an information handling device, e.g., a tablet computing device, a smart phone, a laptop computing device, a navigation device, etc. The voice input may then be interpreted using a voice recognition engine to make an initial determination as to what words/phrases/commands the voice input includes. An embodiment may identify, as part of the recognition/interpretation processing, an ambiguity in interpreting the voice input, e.g., a word or a phrase that has a low confidence level with respect to correct interpretation.

Accordingly, an embodiment may, rather than, e.g., soliciting feedback or utilizing a convention contextual resolution mechanism (e.g., simply examining surrounding words, etc.) thereafter access stored non-audible input associated in time with the ambiguity. For example, an embodiment may operate a non-audible sensor, e.g., a camera that captures images of the user while providing voice input, and store this non-audible input for use in re-interpreting the ambiguity. In this way, an embodiment may determine, e.g., using non-audible inputs derived from, by way of example, lip movements, movements of the user (e.g., mouth, head, gestures, etc.), an appropriate interpretation of the voice input identified as being ambiguous.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip or circuit design found for example in tablet or other mobile computing platforms. Software and processor(s) are combined in a single chip or circuit 110. Processors comprise internal arithmetic units, registers, cache memory, busses, I/O ports, etc., as is well known in the art. Internal busses and the like depend on different vendors, but essentially all the peripheral devices (120) may attach to a single chip or circuit 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) or circuit(s) 130, e.g., a battery management unit, BMU, which manage power as supplied, for example, via a rechargeable battery 140, which may be recharged by a connection to a power source (not shown). In at least one design, a single chip or circuit, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additional devices 120 may be included, for example an audio receiver such as a microphone for receiving voice inputs to a voice input interface, as well as other sensors, e.g., a non-audible sensor such as a camera. A microphone includes components such as a transducer or sensor that converts sounds into an electrical signal based on electromagnetic induction, capacitance change, piezoelectric generation, or other modulation to produce an electrical signal (voltage) from mechanical vibration produced by sound or acoustic waves. A non-audible sensor includes, for example, element(s) that capture data that may be used to derive an image, e.g., such as an image derived from visible light, electromagnetic radiation that is not visible, e.g., infrared, and/or non-audible sound waves, etc. Commonly, system 100 will include a touch screen 170 for data input and display/rendering. System 100 also typically includes various memory devices, for example flash memory 180 and SDRAM 190.

Figure 2:
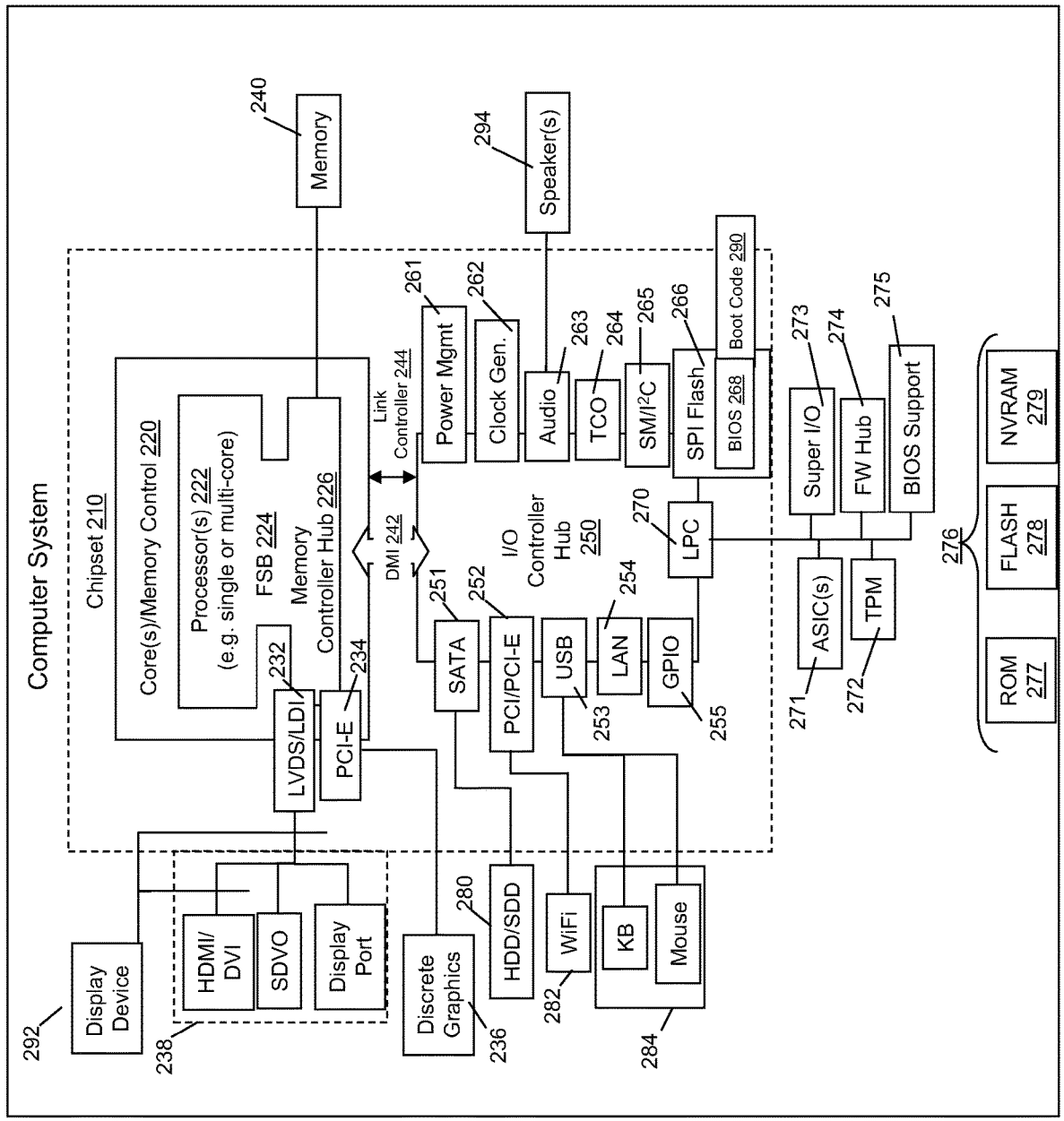
FIG. 2 illustrates another example of an information handling device.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices that provide a voice input interface. For example, the circuitry outlined in FIG. 1 may be utilized in a device such as a smart phone, tablet, navigation device, automobile console, etc., that accepts voice inputs and converts the same to speech for handing by an underlying application (e.g., word processing application, navigation application, Internet searching application, messaging application, etc.). Likewise, the circuitry in FIG. 2 may be utilized in a device such as a laptop or desktop computer that accepts voice commands or inputs for various applications.

Voice input is received by an audio receiver of a device such as outlined in FIG. 1 and/or FIG. 2. For example, a user may provide a voice command to a smart phone or tablet device that is received by a microphone of the device. The received audio is processed, e.g., converted to digital signal, and analyzed by the voice input interface or component thereof, e.g., a speech recognition engine. Various speech recognition engines exist. The speech recognition engine analyzes various characteristics represented by the audio signal of the speech input.

For example, blocks or segments within the audio signal of speech may be parsed to identify word boundaries. The words themselves may then be analyzed for identification of phonemes indicative of a particular word. Words are commonly identified based on a confidence metric, e.g., confidence of match to a known word or words based on characteristics within the audio signal. In an embodiment, any such speech recognition engine may be utilized. In this respect, various data sources, either stored locally and/or accessed remotely, may be used for comparison and analysis purposes by the speech recognition engine.

In some speech recognition engines, once the word(s) themselves have been identified, at least initially, higher order and/or additional pass analyses may be conducted to improve the accuracy. For example, grammar and syntax of the words identified, and the ordering thereof, may be analyzed to determine if the word(s) have been identified properly given the context in which they were presented. Moreover, the speech input may be parsed to identify various component parts having different functionality associated therewith, e.g., predetermined commands vs. message content.

As mentioned above, a common consequence of this process is that a word is misidentified in the processing of the voice input and conversion thereof. For example, in a messaging application accepting input from a voice input interface, a user may speak the following phrases: "Text Bob" followed by "What time is the game." While the actual spoken input includes the word "time", a speech input interface may misinterpret this word and choose a word that sounds similar (and therefore is similar to the speech recognition engine). For example, this text may be interpreted as "What dime is the game."

Conventionally, faced with such an interpretation, the user may manually go back and correct the word "dime", e.g., by touching it/clicking on it via a touch input interface and typing the correct word "time" in, etc. Or, in some voice input interfaces, the speech recognition engine may have assigned "dime" as a low confidence match such that the user need only touch the word "dime" and select from pre-determined matches, one of which may include "time".

In the context where the speech recognition has assigned a low confidence to the word, e.g., "dime" in the example above, an embodiment may utilize non-audible inputs to re-interpret the ambiguous word or words.

By way of example, a user providing voice input of "time" that is scored with low confidence as an input of "dime", context (e.g., sentence structure, etc.) may indeed be useful in re-interpreting the word. However, there are many cases in which contextual data is either not available or not useful. For example, in considering the actual voice input of "look at this guy" versus a misinterpretation of "look at the sky", contextual data such as surrounding words of the phrase may not be useful in determining the correct phrase.

Accordingly, an embodiment utilizes non-audible input, e.g., visual cues captured by a camera, to determine if the user's mouth/lip movements are better matched one word or phrase as compared to another word or phrase. In an embodiment, a standard camera, e.g., visible light camera, may be utilized to capture non-audible data associated with the voice input, e.g., detecting the user's mouth/lip movements for visual data useful in interpreting sounds included in the voice input, e.g., consonant sounds such as "P" or "T" where the lips clearly touch or do not touch.

While there are existing methods to detect speech itself via lip/mouth reading, such methods have not been usefully employed to augment speech recognition engines in re-interpreting ambiguous voice inputs. It is worth noting that while a visible light camera has been described as a non-audible sensor, other sensors may be utilized, e.g., including an infrared camera, an ultrasound receiver, or other sensor capable of capturing useful information, e.g., regarding the surface features of the user's voice input, e.g., the user's lips and/or internal features, e.g., mouth, throat, muscle or bone features, to determine data useful in disambiguation of the voice input.

An embodiment may thus utilize such non-audible inputs associated with the user's voice input, e.g., matched in time, to disambiguate the voice input (or portions thereof), e.g., by mapping the non-audible inputs to known features correlated with sounds/phrases of the voice input. This may be done generally and/or trained for specific users or populations of users. For example, movement of the same body parts may be matched to sounds made in the past to aid speech detection and provide improvements in re-interpreting speech inputs over time.

The capturing and/or processing of the non-audible inputs may be conducted according to a policy, e.g., to take into account energy savings and/or other contextual parameters. For example, if power or battery use is an issue for a particular device, regular speech recognition may be aided by non-audio assisted speech recognition, such use of camera inputs, in certain scenarios, e.g., according to a predetermined policy.

The policy may include, for example, using non-audible inputs if speech confidence is low (either currently or historically, e.g., during a particular session or for a particular user or users). The confidence may be pre-determined to be low for certain word(s) including a predetermined sound characteristic associated with ambiguity, e.g., certain consonant sounds. Thus for example, the policy may continuously capture non-audible inputs but only process the same when certain sounds are included.

The policy may include, for example, using non-audible inputs if multiple speech candidates exist that exceed a pre-defined confidence threshold (of detection) and/or have a similar high-confidence level (of detection). The policy may include, for example, using non-audible inputs when background noise exceeds a threshold, when other detected speech exists simultaneously by someone other than the primary user, when a user repeats a phrase or makes a correction (e.g., the non-audible input such as that captured by a camera may be used for the interpretation of the second input but not the first, etc.), etc. The policy may include, for example, using non-audible inputs when the user's speech is not typical (e.g., based on time of input, e.g., early in the morning versus later in the evening, based on a condition of the user, e.g., eating, lying down (e.g., sensed by a gyroscope), sick (voice is atypical), etc.). The policy may include, for example, using non-audible inputs based on device usage history, e.g., input detected for the first time on a device, based on condition of the device, e.g., device movement or environment, etc. Thus a policy may be put in place such that the non-audible sensor and inputs thereof are either not captured continuously and/or not processed continuously.

Figure 3:
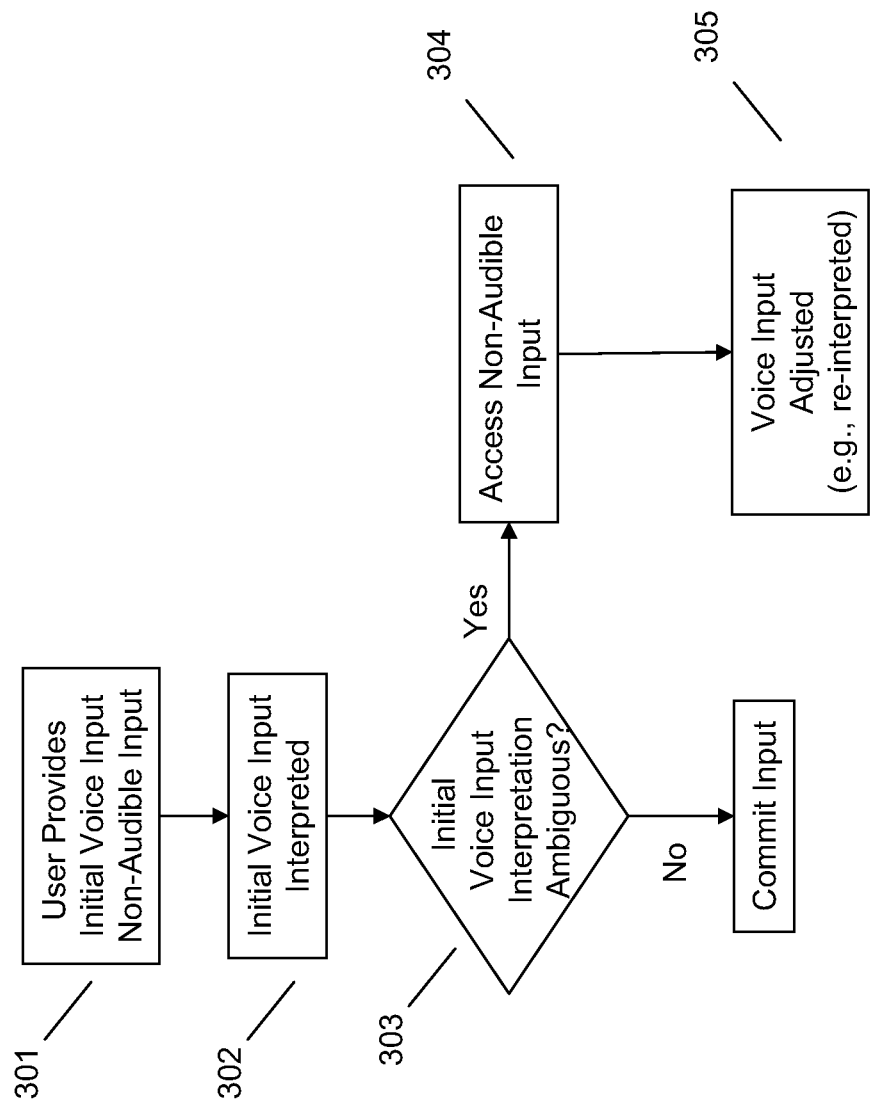
FIG. 3 illustrates an example method of using non-audible voice input correction.

An embodiment therefore may utilize a non-audible input from a user in an intelligent fashion to re-interpret ambiguous speech. Referring to FIG. 3 by way of example, a user provides voice input initially at 301 and, e.g., as dictated by a policy, an embodiment also captures non-audible input of the user such as images captured by a camera. An embodiment may employ a speech recognition engine in interpreting the voice input at 302. As part of this process, an embodiment may determine that certain words are scored with a lower confidence level, e.g., with respect to a predetermined threshold.

An embodiment may therefore identify at 303 at least one ambiguity in interpreting the voice input, e.g., those words having the lower confidence score. If no ambiguity is determined, an embodiment may commit the input as properly interpreted. However, if there is an ambiguity, even if slight, e.g., according to a threshold, an embodiment may thereafter access stored non-audible input associated in time with the at least one ambiguity at 304 (i.e., that is captured during voice input at 301). Again, an embodiment may determine an ambiguity exists at 303 on the basis of certain triggers including triggers other than a low confidence score, e.g., words or word sounds detected in the voice input that, while scored confidently, are associated with ambiguities, e.g., certain consonant sounds, certain words, voice inputs received under certain conditions, etc.

Using the non-audible input, such as lip or mouth movement characteristics, etc., an embodiment may re-interpret the at least one ambiguity using the non-audible input at 305. For example, this may include mapping non-audible input features to features associated with predetermined voice inputs or portions thereof, such as known lip movements associated with known sounds, etc. In this way, an embodiment may utilize additional data available in the non-audible input to assist in the interpretation of various word(s) or phrase(s). This permits an embodiment to more accurately interpret the voice inputs. Additionally, it permits an embodiment to employ a lower threshold for interpretation than usual such that words that may normally be "confidently" interpreted may be confirmed via re-interpretation using non-audible inputs. This may assist in avoiding situations where certain words or phrases are misinterpreted even if scoring high with respect to traditional confidence scoring. The re-interpreting at 304 may also include correcting the voice input, e.g., changing an initial interpretation of the voice input using the non-audible input.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

Any combination of one or more non-signal device readable storage medium(s) may be utilized. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage medium is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   accepting, at an audio receiver of an information handling device, voice input of a user and capturing, using a sensor, non-audio based input correlated with the voice input;
   generating, using one or more speech recognition engines, an initial interpretation by interpreting the voice input without utilizing the non-audio based input for the initial interpretation;
   identifying, using the one or more speech recognition engines, an ambiguous voice input comprising at least one ambiguity in the initial interpretation, wherein the identifying comprises identifying that at least a portion of the initial interpretation is associated with a confidence score meeting a predetermined low confidence threshold, wherein the confidence score is based in part on a condition of the user;
   thereafter augmenting the one or more speech recognition engines and re-interpreting the ambiguous voice input by accessing, using the one or more speech recognition engines, based upon the confidence score meeting the predetermined low confidence threshold, stored non-audio based input matched in time with the ambiguous voice input, wherein the accessing is based upon a policy associated with a confidence level of interpretation, wherein the confidence level of interpretation is based on a device usage history, wherein the re-interpreting comprises mapping the stored non-audio based input to known features of the user while providing voice input correlated with the voice input; and
   adjusting the initial interpretation of the voice input using non-audio based input, wherein the adjusting comprises changing the initial interpretation using the non-audio based input.

2. The method of claim 1, wherein the adjusting comprises correcting the voice input.

3. The method of claim 1, wherein the sensor is a camera.

4. The method of claim 1, wherein said capturing proceeds according to the policy.

5. The method of claim 1, wherein a factor comprises at least one factor selected from the group consisting of: history of low speech recognition confidence, detection of multiple speech candidates, a detection of background noise exceeding a predetermined threshold, detection of a repeated word, and detection of an atypical voice characteristic.

6. The method of claim 4, wherein said policy adjusts said capturing responsive to battery level falling below a predetermined threshold.

7. The method of claim 1, wherein the accessing stored non-audio based input associated in time with the at least one ambiguity comprises accessing non-audible input derived from data selected from the group consisting of visible light image data, non-visible electromagnetic radiation image data, and non-audible sound data.

8. The method of claim 1, wherein the identifying at least one ambiguity in interpreting the voice input comprises identifying a word including a predetermined sound characteristic associated with ambiguity.

9. The method of claim 8, wherein the predetermined sound characteristic associated with ambiguity is a consonant sound.

10. An information handling device, comprising:
   an audio receiver;
   a sensor that captures input;
   one or more processors; and
   a memory storing instructions that are executed by processor to:
   accept, at the audio receiver, voice input of a user and capture, using the sensor, non-audio based input correlated with the voice input;
   generate, using a speech recognition engine, an initial interpretation by interpreting the voice input without utilizing the non-audio based input for the initial interpretation;
   identify an ambiguous voice input comprising at least one ambiguity in the initial interpretation, wherein the identifying comprises identifying that at least a portion of the initial interpretation is associated with a confidence score meeting a predetermined low confidence threshold, wherein the confidence score is based in part on a condition of the user;
   thereafter augmenting the speech recognition engine and re-interpreting the ambiguous voice input by accessing, using the one or more processors, based upon the confidence score meeting the predetermined low confidence threshold, stored non-audio based input matched in time with the ambiguous voice input, wherein the accessing is based upon a policy associated with a confidence level of interpretation, wherein the confidence level of interpretation is based on a device usage history, wherein the re-interpreting comprises mapping the stored non-audio based input to known features of the user while providing voice input correlated with the voice input; and
   adjust the initial interpretation of the voice input using non-audio based input derived from the sensor, wherein to adjust comprises to change the initial interpretation using the non-audio based input.

11. The information handling device of claim 10, wherein to adjust comprises correcting the voice input.

12. The information handling device of claim 10, wherein the sensor is a camera.

13. The information handling device of claim 10, wherein to capture comprises capturing non-audio based input according to the policy.

14. The information handling device of claim 10, a factor comprises at least one factor selected from the group consisting of: history of low speech recognition confidence, detection of multiple speech candidates, a detection of background noise exceeding a predetermined threshold, detection of a repeated word, and detection of an atypical voice characteristic.

15. The information handling device of claim 13, wherein said policy adjusts said capturing responsive to battery level falling below a predetermined threshold.

16. The information handling device of claim 10, wherein to access stored non-audio based input associated in time with the at least one ambiguity comprises accessing non-audio based input derived from data selected from the group consisting of visible light image data, non-visible electromagnetic radiation image data, and non-audible sound image data.

17. The information handling device of claim 10, wherein the identifying at least one ambiguity in interpreting the voice input comprises identifying a word including a predetermined sound characteristic associated with ambiguity.

18. A product, comprising:
   a storage medium having device readable code stored therewith, the device readable code being executable by a processor and comprising:
   code that accepts voice input of a user and code that captures non-audio based input correlated with the voice input;
   code that generates, using a speech recognition engine, an initial interpretation by interpreting the voice without utilizing the non-audio based input for the initial interpretation;
   code that identifies an ambiguous voice input comprising at least one ambiguity in the initial interpretation, wherein the identifying comprises identifying that at least a portion of the initial interpretation is associated with a confidence score meeting a predetermined low confidence threshold, wherein the confidence score is based in part on a condition of the user;
   code that thereafter augmenting the speech recognition engine and re-interpreting the ambiguous voice input by accessing, based upon the confidence score meeting the predetermined low confidence threshold, stored non-audio based input matched in time with the ambiguous voice input, wherein the accessing is based upon a policy associated with a confidence level of interpretation, wherein the confidence level of interpretation is based on a device usage history, wherein the re-interpreting comprises mapping the stored non-audio based input to known features of the user while providing voice input correlated with the voice input; and
   code that adjusts the initial interpretation of the voice input using non-audio based input, wherein the code that adjusts comprises code that changes the initial interpretation using the non-audio based input.

* * * * *